US008681659B2

(12) United States Patent
Badt, Jr. et al.

(10) Patent No.: US 8,681,659 B2
(45) Date of Patent: Mar. 25, 2014

(54) ETHERNET EQUIPMENT UTILIZING CATALOGS AND CONTINUITY CHECKS TO ENHANCE UPNP AND AVB APPLICATIONS

(75) Inventors: Sig Badt, Jr., Richardson, TX (US);
Jessy V. Rouyer, Fort Worth, TX (US);
Timucin Ozugur, Fairview, TX (US);
Ljubisa Tancevski, Dallas, TX (US)

(73) Assignee: Alcatel Lucent, Paris (FR)

( * ) Notice: Subject to any disclaimer, the term of this patent is extended or adjusted under 35 U.S.C. 154(b) by 1627 days.

(21) Appl. No.: 11/539,148

(22) Filed: Oct. 5, 2006

(65) Prior Publication Data

US 2008/0086568 A1 Apr. 10, 2008

(51) Int. Cl.
*H04L 12/28* (2006.01)
*H04L 12/56* (2011.01)

(52) U.S. Cl.
CPC ..................................... *H04L 45/02* (2013.01)
USPC ........... 370/255; 370/254; 370/270; 370/271; 370/329; 370/351; 370/389; 370/390; 370/401; 370/419; 370/447; 709/211; 709/220; 709/221; 709/222; 709/223; 709/224; 709/225; 709/226; 709/227

(58) Field of Classification Search
None
See application file for complete search history.

(56) References Cited

U.S. PATENT DOCUMENTS

| | | | | |
|---|---|---|---|---|
| 7,069,345 | B2 * | 6/2006 | Shteyn | 709/250 |
| 7,194,689 | B2 * | 3/2007 | Manni et al. | 715/735 |
| 7,337,402 | B2 * | 2/2008 | Milton et al. | 715/730 |
| 7,640,329 | B2 * | 12/2009 | Rao et al. | 709/223 |

FOREIGN PATENT DOCUMENTS

EP 1557997 7/2005

OTHER PUBLICATIONS

Ritchie et al, UPnP AV Architecture:1, Jun. 25, 2002.*
UPnP Forum "QoSPolicyHolder:1 Erratum", www.upnp.org, pp. 1-6, Jul. 14, 2006.
UPnP Forum "QoSManager:1 Erratum", www.upnp.org, pp. 1-31, Jul. 14, 2006.
UPnP Forum "QoSDevice:1 Erratum", www.upnp.org, pp. 1-25, Jul. 14, 2006.
UPnP Forum "UPnP QoS Architecture: 1.0", www.upnp.org, pp. 1-28, Mar. 10, 2005.
UPnP Forum "MediaServer:1 Device Template Version 1.01", www.upnp.org, pp. 1-12, Jun. 25, 2002.
UPnP Forum "MediaRenderer: 1 Device Template Version 1.01", www.upnp.org, pp. 1-12, Jun. 25, 2002.
J. Ritchie et al., "UPnP AV Architecture:0.83", XP-002318803, Jun. 12, 2002, 22 pages.
F. Feng et al., "End-to-end Stream Establishment in Consumer Home Networks", XP-002473600, 2005, 4 pages.
Partial International Search Results, Intl Appl. No. PCT/US2007/080295, Apr. 4, 2008, 9 pages.

\* cited by examiner

*Primary Examiner* — Faruk Hamza
*Assistant Examiner* — Aixa A Guadalupe Cruz
(74) *Attorney, Agent, or Firm* — Capitol Patent & Trademark Law Firm PLLC

(57) ABSTRACT

A method and an Ethernet local area network are described herein in which the Ethernet local area network is configured to enable a talking device (e.g., microphone) to send a media stream to one or more listening devices (e.g., speakers). In one embodiment, the method for configuring the Ethernet local area network includes the following steps: (1) providing a user of a talking device with a "relevant" catalog which contains information including positional information about one or more listening devices; (2) allowing the user to interface with the "relevant" catalog so they can select at least one of the listening device(s); (3) enabling the talking device to send a subscribe-request message to the selected listening device(s) requesting that the selected listening device(s) subscribe to the talking device; (4) and sending a media stream from the talking device to the selected listening device(s).

14 Claims, 11 Drawing Sheets

ETHERNET EQUIPMENT UTILIZING CATALOGS AND CONTINUITY CHECKS TO ENHANCE UPNP AND AVB APPLICATIONS

BACKGROUND OF THE INVENTION

1. Field of the Invention

The present invention is related to a method for configuring an Ethernet local area network to enable a talking device (e.g., microphone) to send a media stream to one or more listening devices (e.g., speakers).

2. Description of Related Art

Two standard committees are currently attempting to expand the use of Ethernet by enabling applications to be implemented on an Ethernet local area network (LAN) which require a high quality of service (low latency and low jitter) like a media stream application. The two standard committees are:

1. Audio/Video Bridging (AVB) Task Group (IEEE Std. 802.1Q™-2005)
2. Universal Plug and Play (UPnP) Forum The AVB task group is working on specifications that can be used to enable a media stream to be transported on an Ethernet LAN between a talking device and a listening device. While, the UPnP forum is working on specifications that will give the talking device and listening device enough information so they can set-up the media stream. In particular, the AVB task group is working on modifying the existing Ethernet technology which occasionally has latency and jitter on the order of tens of milliseconds that can make it difficult to transport a media stream over an Ethernet LAN between the talking device and the listening device. And, the UPnP forum is working on automating the task of configuring an Ethernet LAN so that the devices connected thereto like the talking device and the listening device can have enough information so they are able to set-up the media stream.

FIG. 1 (PRIOR ART) shows an example of the use of an AVB media stream 102 between a talking device 104 (e.g., microphone 104) which is the source of the media stream 102 and a listening device 106 (e.g., speaker 106) which is the destination of the media stream 102. In accordance with the existing AVB protocol, the speaker 106 needs to send a subscribe request 108 to the microphone 104 before it will be able to receive a high quality media stream 102 from the microphone 104. But, before this can happen, the microphone 104 needs to acquire a stream ID from an unspecified source and give that stream ID to the Ethernet LAN 100. And, the speaker 106 needs to obtain the same stream ID and the stream's bandwidth from an unspecified source. Then, once this is done, the speaker 106 can send the subscribe request 108 for the media stream by telling the Ethernet LAN 100 that it wants to subscribe to that stream ID. The AVB specification does not specify how the speaker 106 (listening device 106) learns the stream ID and the bandwidth of the media stream which outputs from the microphone 104 (talking device 104). This is done instead by UPnP which is, among other things, a "discovery protocol" that distributes information about end systems which are connected to an Ethernet LAN to other end systems which are also connected to the same LAN.

FIG. 2 (PRIOR ART) shows an example of the use of UPnP where the microphone 104 (talking device 104) and the speaker 106 (listening device 106) both advertise the information which will be used so they can set-up the media stream 102. As shown, the microphone 104 and the speaker 106 respectively broadcast advertisements 112 and 114 on the Ethernet LAN 100 indicating their presence and the services they provide. These advertisements 112 and 114 do not cause anything to happen, instead they just distribute information. This is all fine and well but there are still some technical problems related to the AVB and UPnP specifications which have not yet been solved by the two standards committees. These technical problems will be discussed in detail next with respect to FIGS. 3-8 (PRIOR ART).

FIGS. 3-5 (PRIOR ART) illustrate a large conference room 300 in an office building which is used to help explain some of the technical problems associated with the current AVB and UPnP specifications. The large conference room 300 has two microphones 104a and 104b and two speakers 106a and 106b all of which are connected to one another by a single Ethernet LAN 100 (not shown in this particular set of drawings). In FIG. 3, the large conference room 300 is divided into conference room A and conference room B by using a sliding partition 304. In this configuration, the first microphone 104a sends a media stream 102a to the first speaker 106a and the second microphone 104b sends a media stream 102b to the second speaker 106b. FIG. 4 shows the large conference room 300 with the partition 304 removed. In this configuration, one microphone 104a (for example) sends one media stream 102a to both speakers 106a and 106b. In both of these configurations, the AVB protocol is used to transport the necessary media streams 102a and 102b but it is the responsibility of the UPnP protocol to give the microphones 104a and 104b and the speakers 106a and 106b enough information so they can set-up the media streams 102a and 102b. FIG. 5 is a diagram showing the UPnP signaling and the AVB signaling between the first microphone 104a and the two speakers 106a and 106b which is needed to establish the media stream 102a utilized in the configuration shown in FIG. 4. In UPnP terminology, the microphones 104a and 104b are considered "control points" and the speakers 106a and 106b are considered "devices".

The exemplary large conference room 300 shown in FIGS. 3-5 has three specific problems (which will be solved by the present invention). These problems are as follows:

1. The microphone 104a in conference room A should not have the option of talking to the speaker 106b in conference room B when the partition 304 is in place (see FIG. 6).

2. The speakers 106a and 106b (listening devices) do not in practice subscribe to microphones 104a and 104b (talking devices). Instead, the microphones 104a and 104b should subscribe to the speakers 106a and 106b (see FIG. 7).

3. The UPnP advertisements do not contain enough information such as positional information so one can properly configure the Ethernet LAN 100 (see FIG. 8).

FIG. 6 (PRIOR ART) is provided to illustrate the first problem in which the microphone 104a (located in conference room A) should not have the option of sending a media stream 102a to the speaker 106b (located in conference room B) when the partition 304 divides the large conference room 300. In other words, one does not want to get their virtual wires crossed between the microphone 104a (talking device) and the speaker 106b (listening device). The current AVB and UPnP specifications do not address this particular problem.

FIG. 7 (PRIOR ART) is provided to illustrate the second problem in which the speakers 106a and 106b (listening devices) are not the ones in practice that normally subscribe to microphones 104a and 104b (talking devices). In the current AVB specifications, the speaker 106 (listening device 106) needs to subscribe to a microphone 104 (talking device 104) but it's not likely that a speaker 106 is ever going to subscribe to a microphone 104. Because, the microphone 104 is most likely going to being used by a person and the speaker 106 is most likely going to be just hanging on a wall. In this case, it is the person that is using the microphone 104 who really needs to initiate the subscription. Thus, the AVB requirement where the listening device needs to subscribe to the talking device is not by itself practical in some "real-life" applications.

FIG. 8 (PRIOR ART) is provided to illustrate the third problem in which the current UPnP advertisements from the microphones 104a and 104b and the speakers 106a and 106b do not contain enough information so one can properly configure the Ethernet LAN 100. In particular, the speakers 106a and 106b advertise to every device on the Ethernet LAN 100 that they happen to be speakers 106a and 106b, but they don't say anything about where they happen to be located. Accordingly, there has been and is a need to address these shortcomings and other shortcomings which are associated with the current AVB and UPnP specifications. These needs and other needs are satisfied by the present invention.

BRIEF DESCRIPTION OF THE INVENTION

A method and an Ethernet local area network are described herein in which the Ethernet local area network is configured to enable a talking device (e.g., microphone) to send a media stream to one or more listening devices (e.g., speakers). In one embodiment, the method for configuring the Ethernet local area network includes the following steps: (1) providing a user of a talking device with a "relevant" catalog which contains information including positional information about one or more listening devices; (2) allowing the user to interface with the "relevant" catalog so they can select at least one of the listening device(s); (3) enabling the talking device to send a subscribe-request message to the selected listening device(s) requesting that the selected listening device(s) subscribe to the talking device; (4) and sending a media stream from the talking device to the selected listening device(s).

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
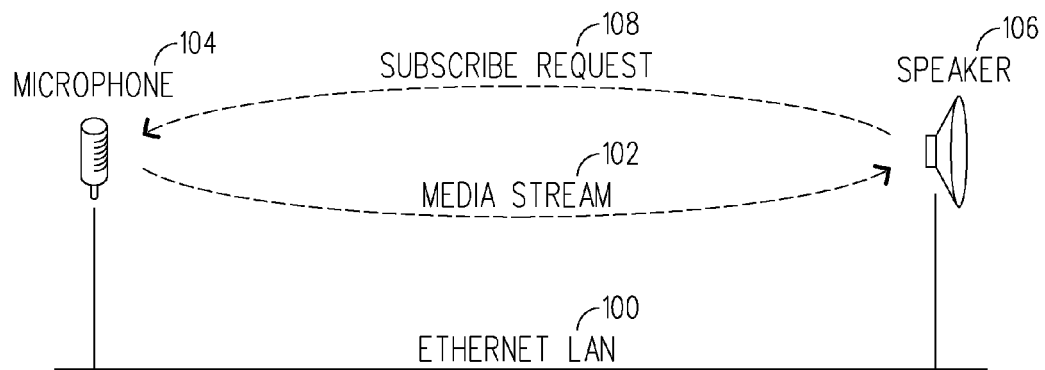
FIGS. 1-8 (PRIOR ART) are diagrams which are used herein to help explain the problems associated with using the current ABV and UPnP specifications to configure an Ethernet LAN so as to enable a talking device (e.g., microphone) to send a media stream to one or more listening devices (e.g., speakers)
Figure 2:
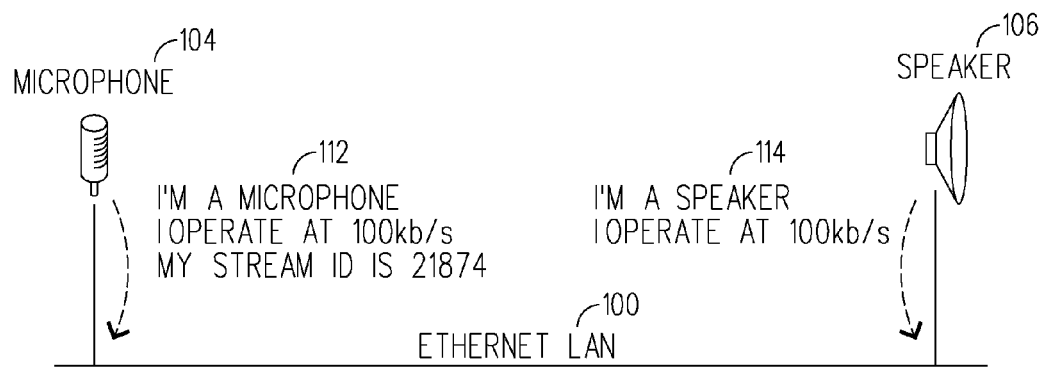
Figure 3:
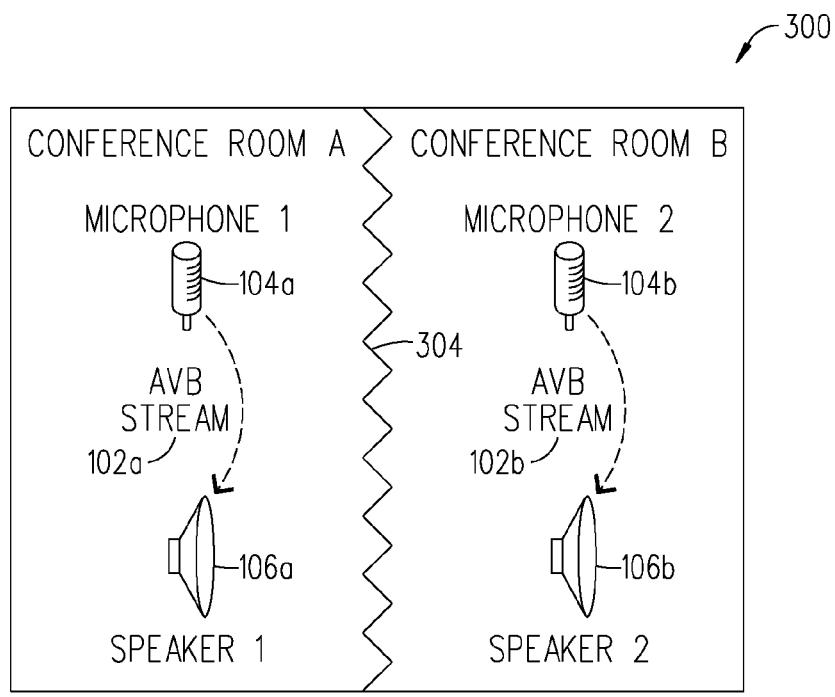
Figure 4:
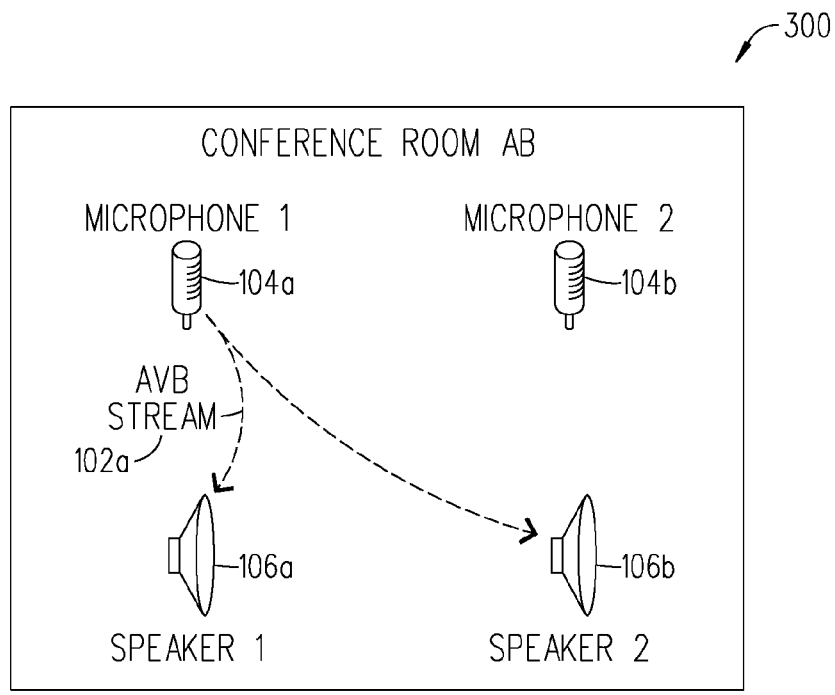
Figure 5:
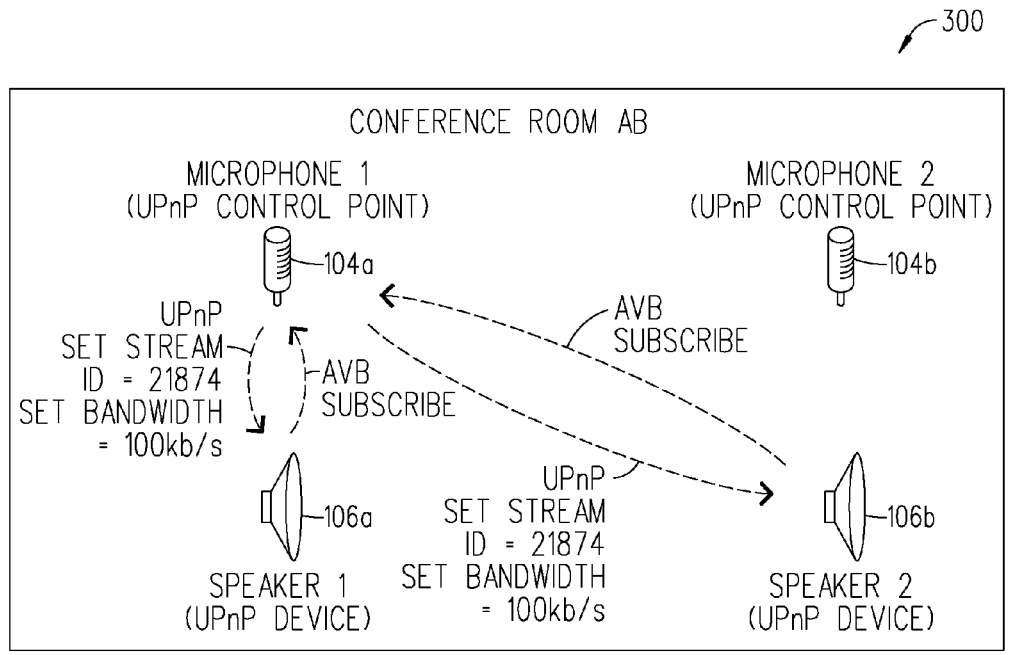
Figure 6:
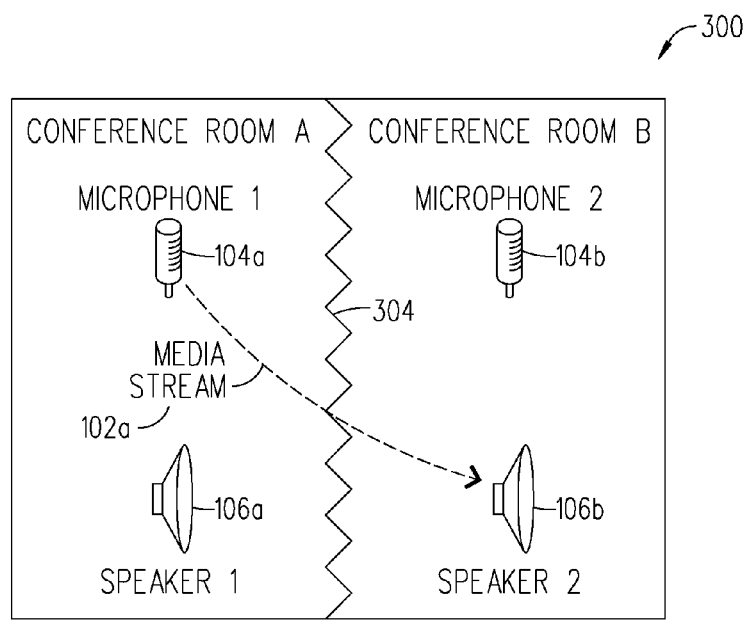
Figure 7:
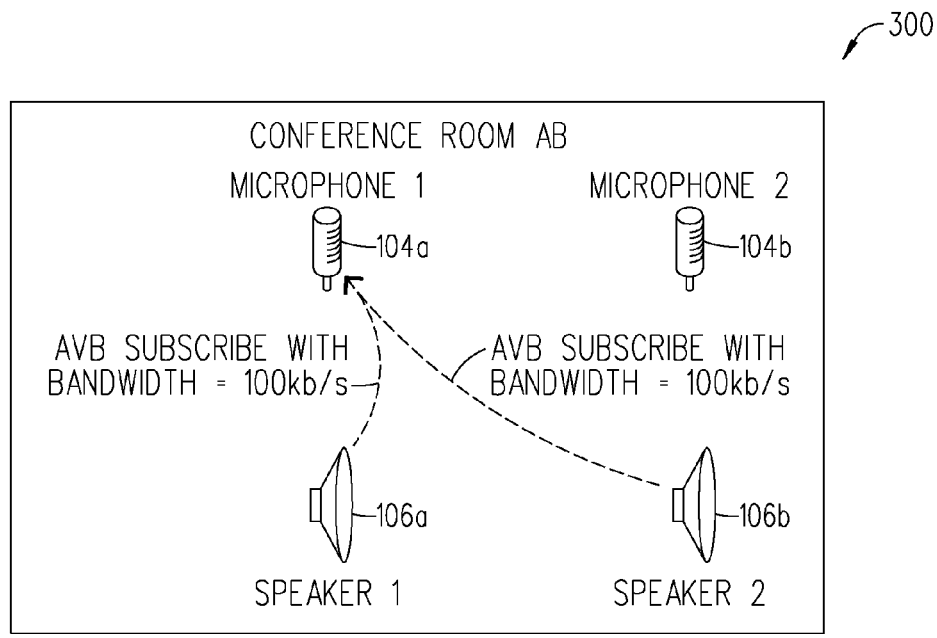
Figure 8:
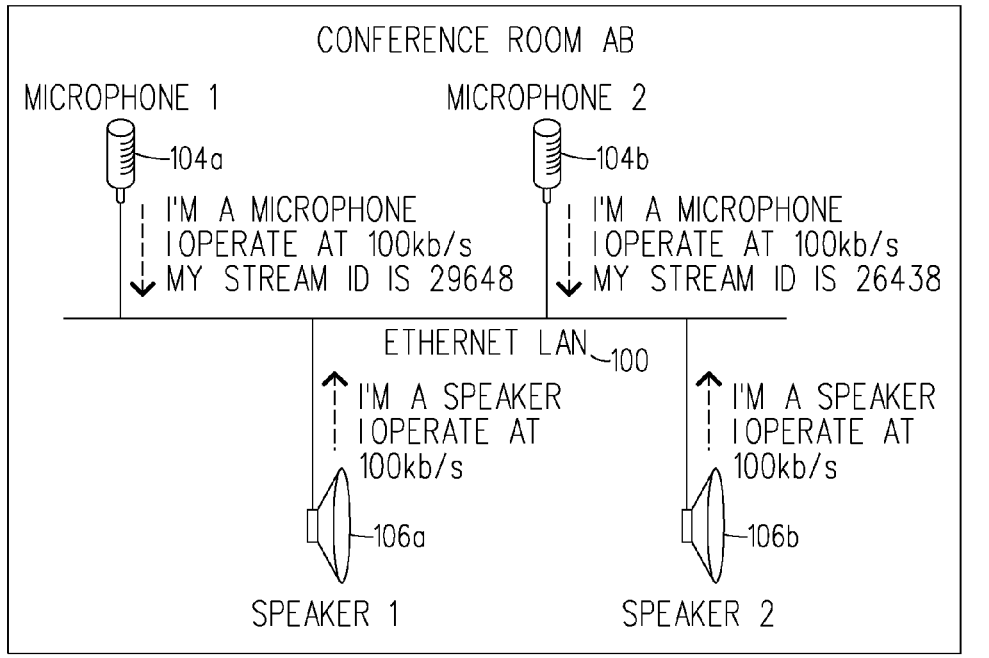
Figure 9:
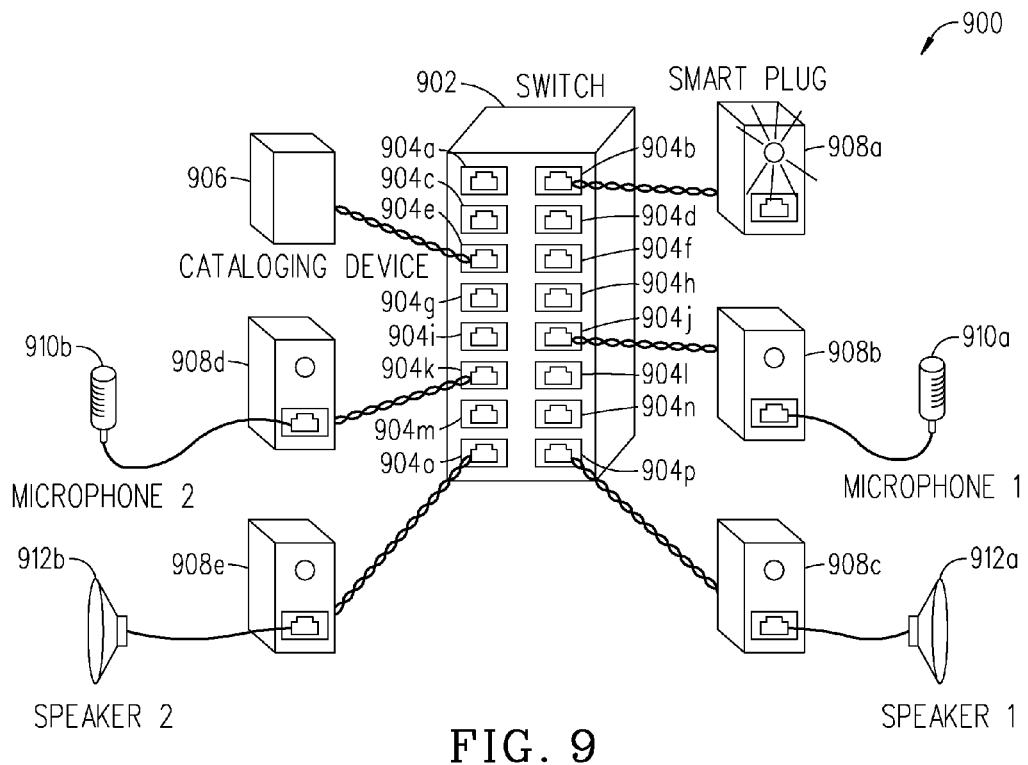
FIGS. 9-22 are diagrams which are used herein to help explain how the present invention addresses those problems so that an Ethernet LAN can be configured to enable a talking device (e.g., microphone) to send a media stream to one or more listening devices (e.g., speakers).

Referring to FIG. 9, there is a diagram illustrating an exemplary Ethernet LAN 900 (point-to-point Ethernet LAN 900) which has components that are used to address the aforementioned problems associated with the current AVB and UPnP specifications in accordance with the present invention. The exemplary Ethernet LAN 900 includes a switch 902 (with ports 904a, 904b . . . 904p), a cataloging device 906, and a plurality of smart plugs 908a, 908b . . . 908e. As shown, the cataloging device 906 is connected to port 904e which is located within the switch 902. And, the smart plugs 908a, 908b . . . 908e are respectively connected to ports 904b, 904j, 904p, 904k and 904o which are located within the switch 902.

In this particular application, the microphones 910a and 910b are respectively connected to smart plugs 908b and 908d, and the speakers 912a and 912b are respectively connected to smart plugs 908c and 908e (alternative applications involving end devices such as a DVD, a TV and speakers are discussed below with respect to FIG. 22). A detailed discussion is provided next to explain how this exemplary point-to-point Ethernet LAN 900 can be used to address the aforementioned problems associated with the prior art.

Figure 10:
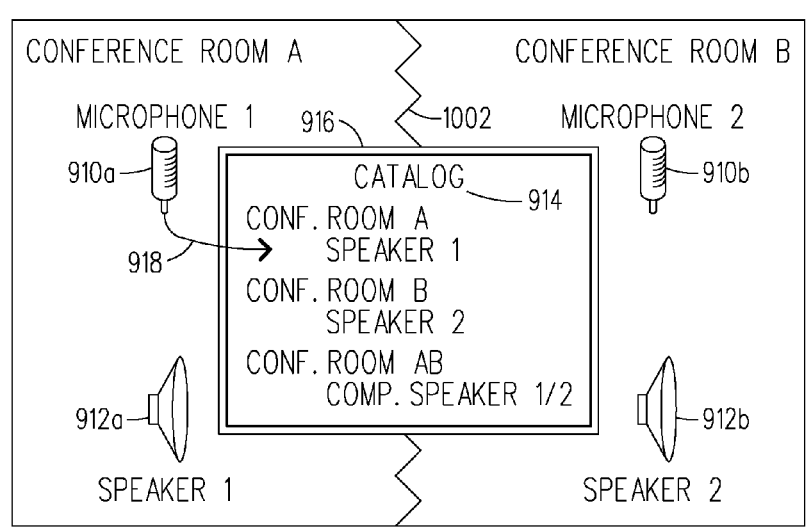
Figure 11:
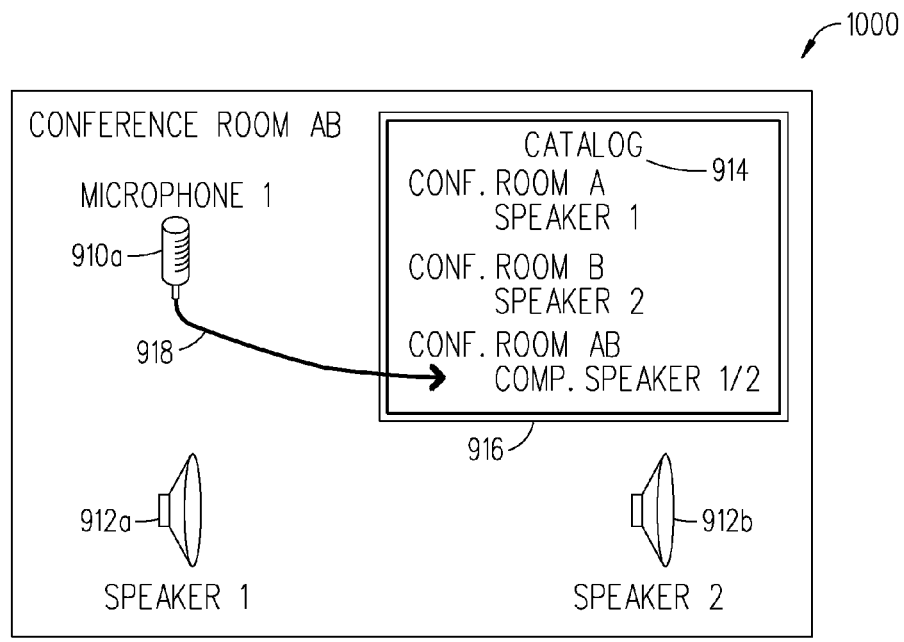

A solution to the first problem associated with the prior art involves providing a user of the microphone 910a (for example) with a catalog 914 which identifies the speaker(s) 912a, 912b or 912a/912b that are attached to the Ethernet LAN 900. FIG. 10 is provided to help explain this solution where there is shown an exemplary conference room 1000 which has a partition 1002 that effectively forms conference room A and conference room B. In conference room A, there is located the first microphone 910a and the first speaker 912a. In conference room B, there is located the second microphone 910b and the second speaker 912b. In this example, a person holding the first microphone 910a interfaces with a catalog 914 to see that this particular microphone 910a has access to three speakers including the first speaker 912a, the second speaker 912b and the composite speaker 912a/912b (two speakers that are treated as one speaker). The person holding the microphone 910a can use the catalog 914 to choose which speakers 912a, 912b or 912a/912b that he/she wants to use. Of course, the person would likely use the catalog 914 to select the first speaker 912a. In FIG. 11, the conference room 1000 does not have the partition 1002 and in this situation the person using microphone 910a would likely use the catalog 914 to select the composite speaker 912a/912b.

As shown in FIGS. 10 and 11, the microphone 910a has a man/machine interface (MMI) 916 so the user is able to see the catalog 914 and select the desired speakers 912a, 912b or 912a/912b. As can be seen, the MMI 916 functions to display the catalog information to the user and also functions to receive an input 918 from the user indicating the selected speaker 912a, 912b or 912a/912b. In one embodiment, the MMI 916 could be a text display with some form of pointing device. In another embodiment, the MMI 916 may be a single button on the microphone 910a where each time the user presses the button their voice will come out from a different speaker 912a, 912b or 912a/912b.

Figure 12:
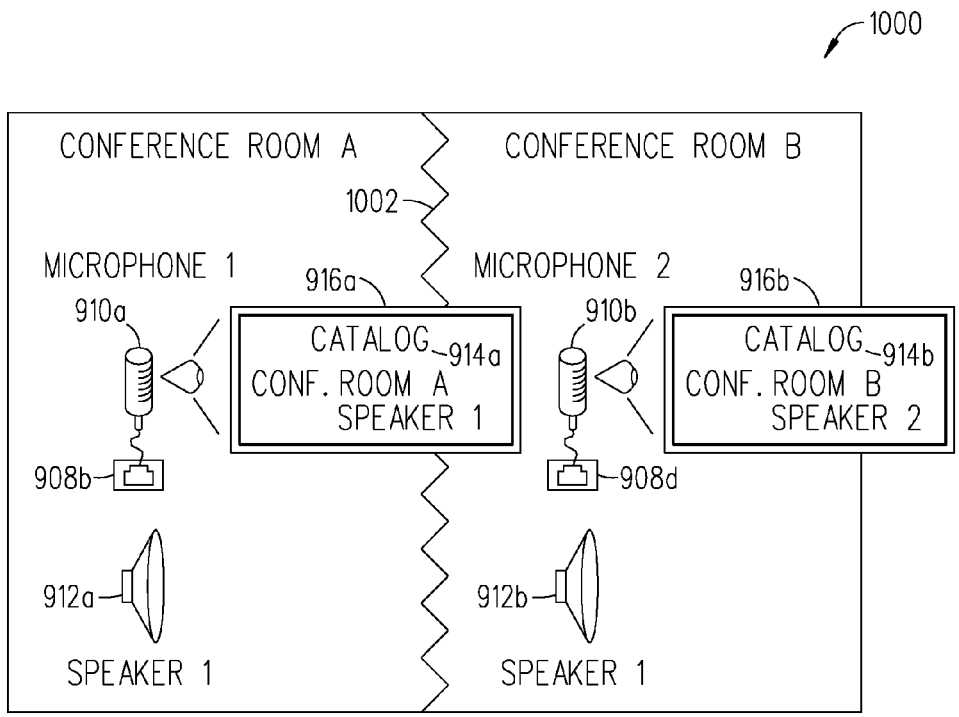

In the conference room 1000 where the partition 1002 is placed to form conference rooms A and B, the user may not want the first microphone 910a (located in conference room A) to have the option of talking to the speaker 912b (located in conference room B) (see FIG. 10). To help ensure this does not happen, the microphones 910a and 910b can be provided with different catalogs 914a and 914b depending on which smart plugs 908b and 908d they happed to be plugged into within the conference room 1000. FIG. 12 is provided to illustrate this particular feature of the present invention wherein when the first microphone 910a is connected to smart plug 908b then the MMI 916a displays the "relevant" catalog 914a (which indicates the first speaker 912a and not the second speaker 912b). Likewise, when the second microphone 910b is connected to smart plug 908d then the MMI 918b displays the "relevant" catalog 914b (which indicates the second speaker 912b and not the first speaker 912a). This particular feature of the present invention is described in more detail during the discussion about the smart plugs 908a, 908b . . . 908e.

The catalogs 914, 914a and 914b do not function as firewalls and as such do not prevent the microphones 910a and 910*b* from talking to any of the other speakers 912*a*, 912*b* or 9112*a*/912*b*. Instead, as shown in FIG. 12, the first catalog 914*a* makes it less likely that the first microphone 910*a* would talk to the second speaker 912*b* because this particular speaker 912*b* is not visible in catalog 914*a*. Again, the catalogs 914, 914*a* and 914*b* (which function sort of like extensions to UPnP advertisements) do not by themselves cause anything to happen, for instance, they do not create the media streams nor do the data packets of the media streams pass through them on their way to the selected speaker(s) 912*a*, 912*b* or 912*a*/912*b*. A detailed discussion is provided later to explain how catalogs 914, 914*a* and 914*b* can be created/populated by using continuity checks and the smart plugs 908*a*, 908*b* . . . 908*e*.

Figure 13:
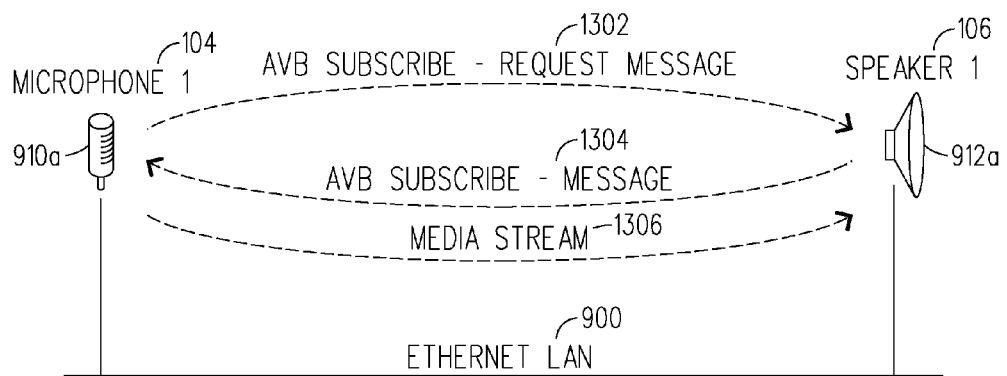

Another one of the problems which was not addressed by the prior art was that speakers 912*a* and 912*b* (listening devices) do not in practice subscribe to microphones 910*a* and 910*b* (talking devices). Instead, the microphones 910*a* and 910*b* should in practice be the ones that subscribe to the speakers 912*a* and 912*b*. That is, sometimes the current AVB resource reservation protocol does not work in a desired manner. One solution to this problem is to have the microphone 910*a* (for example) send an AVB subscribe-request message 1302 to the appropriate speaker 912*a* (for example). Then, the speaker 912*a* can send a subscribe message 1304 to the microphone 910*a*. This particular signaling is shown in FIG. 13 where the microphone 910*a* sends the AVB subscribe-request message 1302 requesting that the speaker 912*a* itself subscribe to receive the media stream 1306 from the microphone 910*a*. The AVB subscribe-request message 1302 contains all of the information (e.g., stream ID 21874, bandwidth 100 kb/s) that the speaker 912*a* would need to subscribe to the microphone 910*a*. Upon receiving the AVB subscribe-request message 1302, the speaker 912*a* may or may not do what the microphone 910*a* requested it to do. In this particular case, the speaker 912*a* does what was requested by the microphone 910*a* and sends a subscribe message 1304 (e.g., subscribe to media stream ID 21874 with bandwidth 100 kb/s) to the microphone 910*a*. Thereafter, the microphone 910*a* sends the media stream 1306 to the speaker 912*a*.

Figure 14:
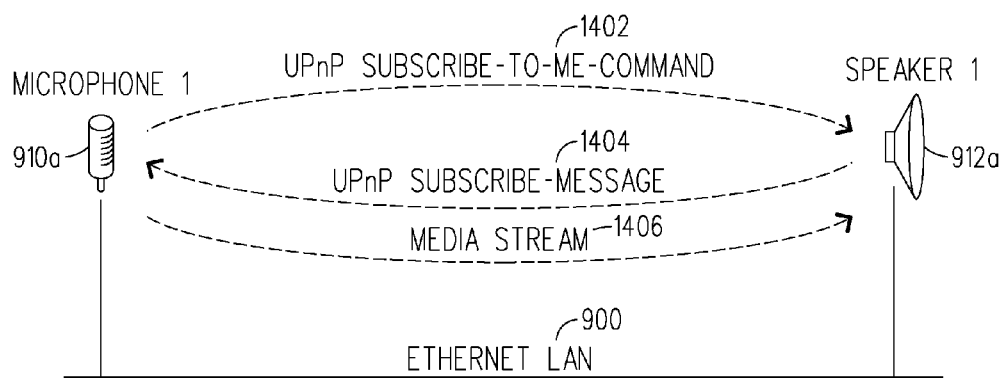

Another solution to this particular problem is to have the microphone 910*a* (for example) send an UPnP subscribe-to-me-command 1402 to the appropriate speaker 912*a* (for example). Then, the speaker 912*a* can send a subscribe message 1404 to the microphone 910*a*. This particular signaling is shown in FIG. 14 where the microphone 910*a* (UPnP control point) sends the UPnP subscribe-to-me-command 1402 commanding the speaker 912*a* (UPnP device) to subscribe to receive the media stream 1406 of the microphone 910*a*. The UPnP subscribe-to-me-command 1402 contains all the information (e.g., stream ID 21874, bandwidth 100 kb/s) that the speaker 912*a* would need to subscribe to the microphone 910*a*. Upon receiving the UPnP subscribe-to-me-command 1402, the speaker 912*a* sends a subscribe message 1404 (e.g., subscribe to media stream ID 21874 with bandwidth 100 kb/s) to the microphone 910*a*. Thereafter, the microphone 910*a* sends the media stream 1406 to the speaker 912*a*.

Figure 15:
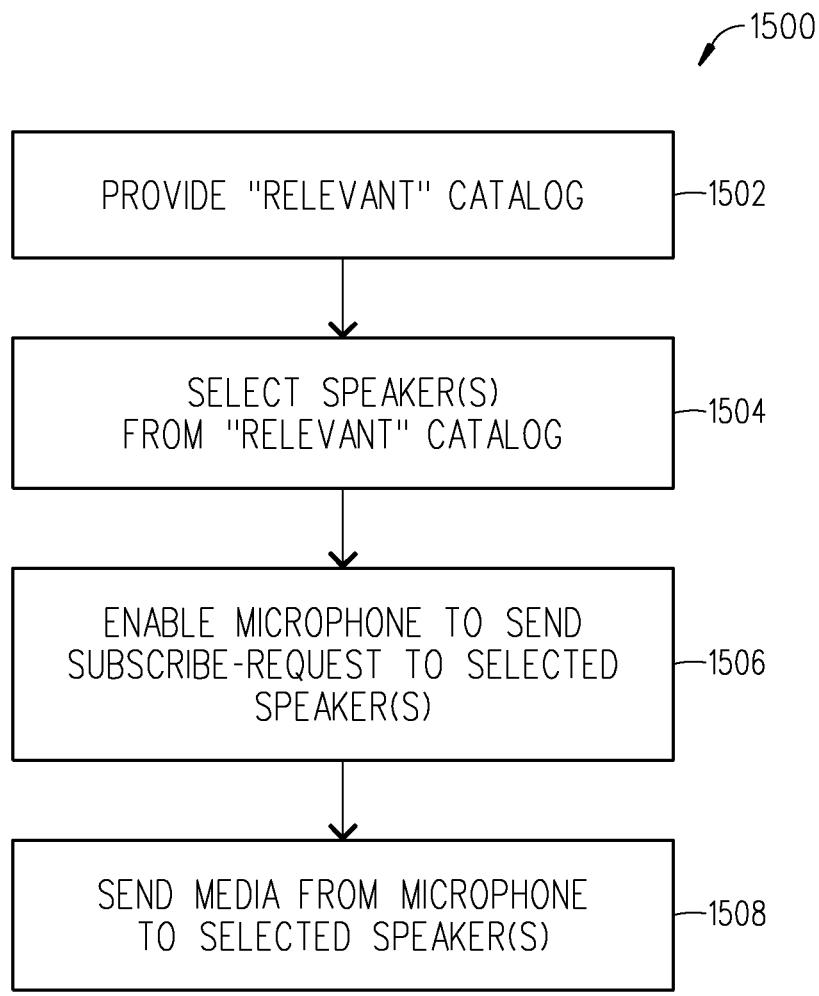

The last problem associated with the prior art was where the UPnP advertisements did not contain enough information such as positional information so a user/network administrator could properly configure the Ethernet LAN 900. This problem is solved by the present invention but before this solution is discussed a description is provided about how one can configure the Ethernet LAN 900 in accordance with the present invention. FIG. 15 is a flowchart illustrating the basic steps associated with a method 1500 for configuring the Ethernet LAN 900 in accordance with the present invention. Beginning at step 1502, the user of the microphone 910*a* (talking device) is provided with a "relevant" catalog 914 which contains information about the speakers 912*a*, 912*b* and/or 912*a*/912*b* (listening devices). At step 1504, the user of the microphone 910*a* is allowed to interface with the "relevant" catalog 914 so they can select at least one of the speakers 912*a*, 912*b* or 912*a*/912*b* over which the user whishes the sound of their voice to be heard (see FIGS. 10-12). At step 1506, the microphone 910*a* sends a subscribe-request message (AVB subscribe-request message 1302 or the UPnP subscribe-to-me-command 1402) to the selected speaker(s) 912*a*, 912*b* and/or 912*a*/912*b* (see FIGS. 13 and 14). At step 1508, the microphone 910*a* sends the media stream directly to the selected speaker(s) 912*a*, 912*b* and/or 912*a*/912*b* assuming the selected speaker(s) 912*a*, 912*b* and/or 912*a*/912*b* sent a subscribe message 1304 or 1404 to the microphone 910*a* (see FIGS. 13 and 14). A discussion is provided next to explain how the cataloging device 906 can be used to populate and add positional information about the end systems (microphones 910*a* and 910*b* and speakers 912*a* and 912*b*) to the catalogs 914, 914*a* and 914*b*.

Figure 22:
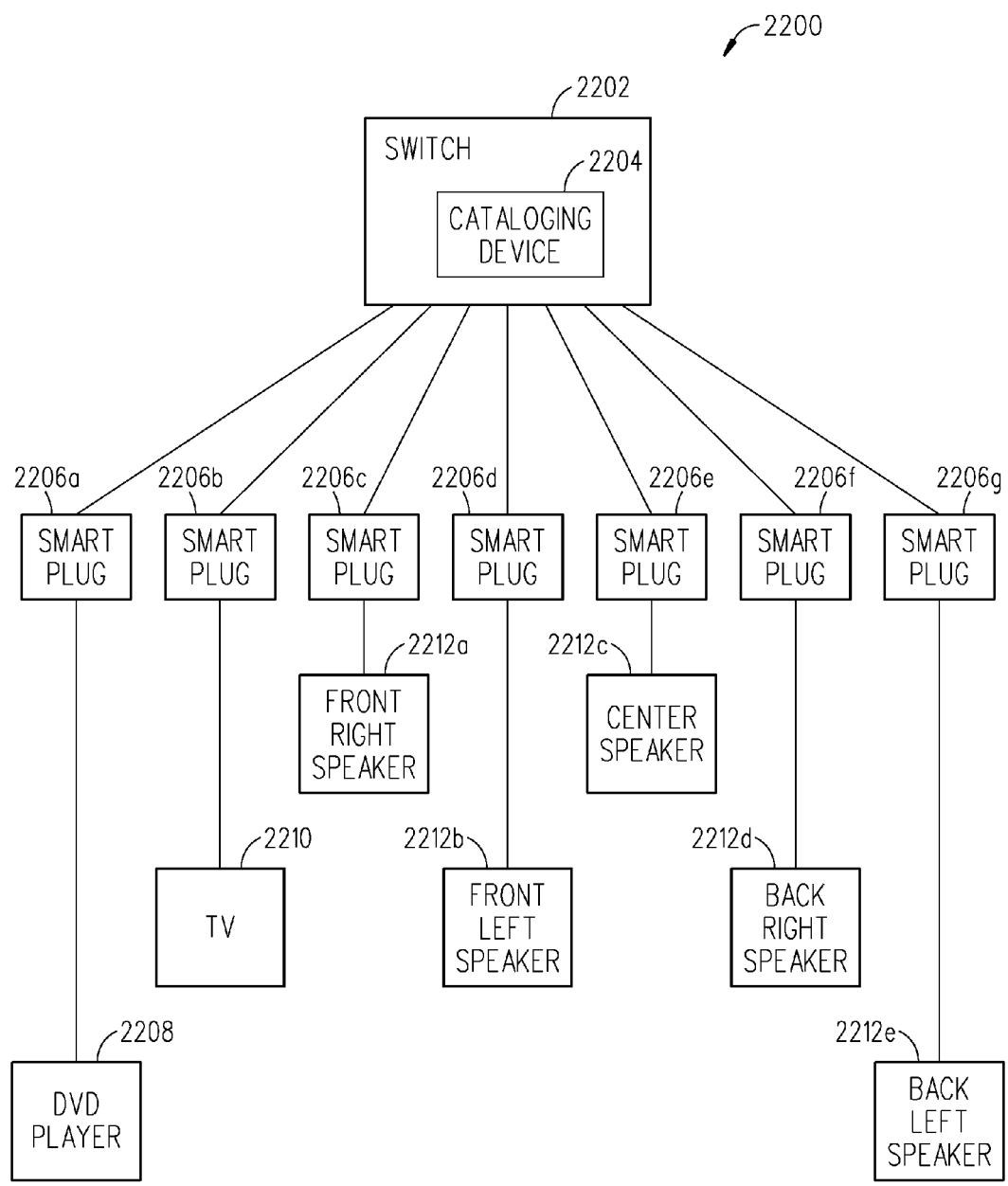

The cataloging device 906 is both an UPnP device and an UPnP control point which may or may not be located within the switch 902 (see FIGS. 9 and 22). In the Ethernet LAN 900, there can be just one cataloging device 906 per each VLAN. If two or more cataloging devices 902 are connected to a single VLAN, then a voting algorithm would pick one of the cataloging devices 902 which would be used to perform the compositing/cataloging function for that particular VLAN. The remaining cataloging device(s) 902 would be instructed to turn themselves off, or to go into standby mode.

Figure 16:
Figure 17:
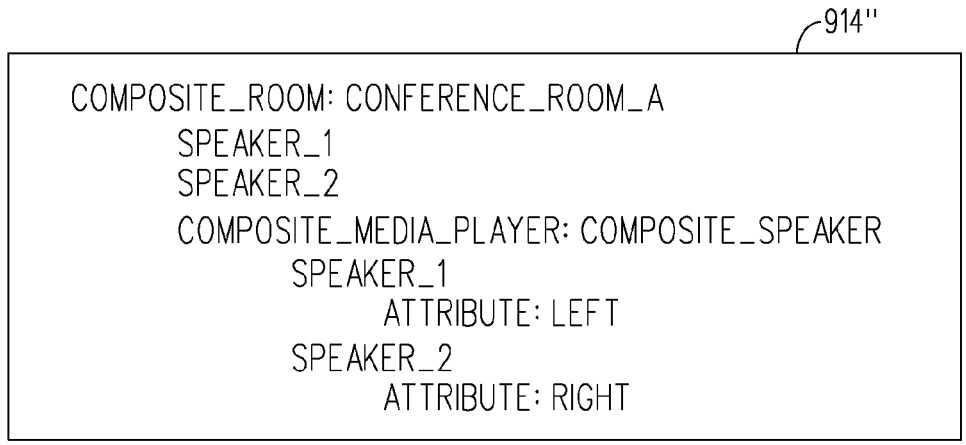

When the cataloging device 906 is first connected to the Ethernet LAN 900, it builds an initial catalog 914' which contains the information that can only be gathered automatically (see FIG. 16). After that, the user/network administrator may want to add some more information to the initial catalog 914'. FIG. 17 illustrates an exemplary catalog 914" in which the user/network administrator has added the following information:

"Conference Room A" is a composite room.
"Composite Speaker" is a composite media player.
"Left" is a user-set attribute of a Composite_Media_Player.

A "composite" is a construct that only exists inside the catalog 914". In FIG. 17, the composite speaker is made up of two speakers 912*a*/912*b*, if a microphone 910*a* (for example) wants to talk to that composite speaker 912*a*/912*b*, then it is up to the microphone 910*a* to figure out how it wants to send its media stream to the composite speaker 912*a*/912*b*. For instance, if the microphone 910*a* is a monaural microphone, then this type of microphone 910*a* may set-up one multicast media stream to be sent from itself to the two speakers 912*a*/912*b*. However, if the microphone 910*a* is a binaural microphone, then this type of microphone may set-up two different media streams such that first speaker 912*a* receives the left channel of the media stream and the second speaker 912*b* receives the right channel of the media stream. This compositing/cataloging function can be added to the UPnP protocol and/or the AVB protocol. As a result, the operation of the cataloging device 906 would essentially be the same regardless of whether this compositing/cataloging function was enabled by the UPnP protocol or the AVB protocol.

Looking at the catalog 914" which is shown in FIG. 17, brings up another issue that is addressed by the present invention. This issue relates to how the user/network administrator who configures the catalog 914" knows that the first speaker 912a is the left speaker and that the second speaker 912b is the right speaker. From their viewpoint, the two speakers 912a and 912b are just two speakers that happen to be plugged into the same Ethernet LAN 900. To solve this problem, the user/network administrator can perform a continuity check which is yet another feature of the present invention. The continuity check could be performed in accordance with anyone of several different ways two of which are discussed below with respect to FIGS. 18 and 19.

Figure 18:
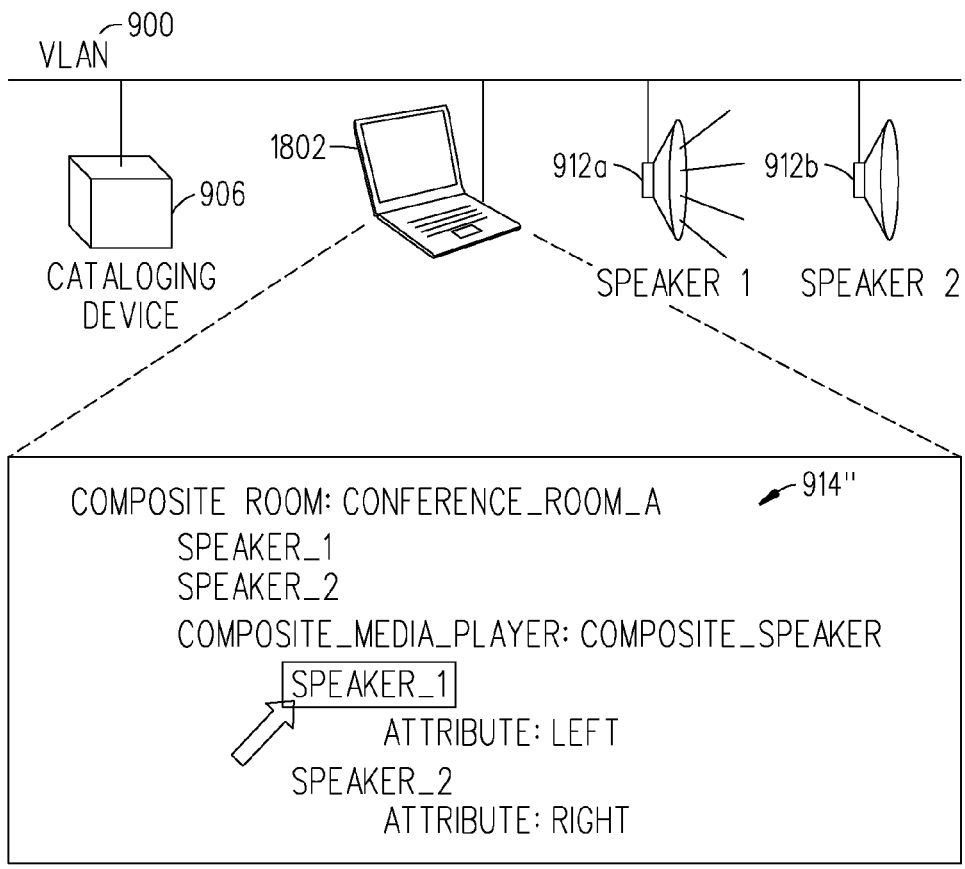

FIG. 18 which illustrates only a portion of the Ethernet LAN 900 is provided to help explain one possible way for performing a continuity check so the user/network administrator can determine the location of a speaker 912a and 912b. This exemplary continuity check can be performed as follows: (1) the user/network administrator uses a GUI 1802 to select the item Composite_Speaker/Speaker_1 from the catalog 914" and then selects continuity check; (2) the cataloging device 906 causes a test media stream (which may be a voice saying "right speaker") to be sent to Speaker_1 912a; (3) if speaker_1 912a is not the right speaker then the user/network administrator performs a second continuity check and this time the words "right speaker" would come from Speaker_2 912b; and (4) the user/network administrator confirms this is correct.

Figure 19:
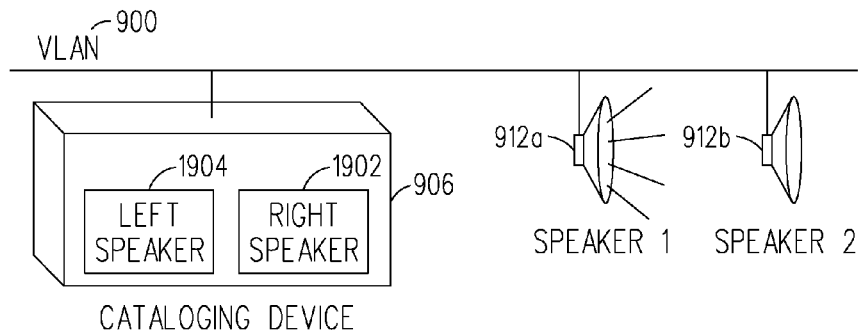

In another scenario, the continuity check could be a simple process. FIG. 19 which illustrates only a portion of the Ethernet LAN 900 is provided to help explain this simple process which could be used to perform a continuity check to determine the location of a speaker 912a and 912b. As shown, the cataloging device 906 could come with various buttons including one button 1902 which is labeled "right speaker" and a second button 1904 which is labeled "left speaker". The user/network administrator can perform a continuity check by pressing the desired button 1902 until the words "right speaker" come from the right speaker 912b. In this scenario, no PC, GUI, or web browsers would be required.

Referring back to FIG. 12, there was a discussion about how it would be desirable to have only the "relevant" catalogs 914a and 914b visible to each of the microphones 910a and 910b. To enable this, the smart plug 908a, 908b . . . 908e was introduced so a user/network administrator would be provided the "relevant" catalog 914a and 914b which was selected depending on which smart plug 908a, 908b . . . 908e their microphone 910a and 910b happened to be plugged into at that time. The differences between a standard plug, a standard port and a smart plug are discussed next.

A standard plug is just an Ethernet physical outlet which is usually mounted on a wall into which one can plug an end system such as, for example, a microphone 910a, a speaker 912a or a video projector. The standard plug is not the same device as the standard port which is an Ethernet physical outlet located on a bridge, switch, or router (see ports 904a, 904b . . . 904p in switch 902 of FIG. 9). The standard port and the standard plug can be connected together by a radio link, wire, or optical fiber. The user/network administrator can easily find out where the standard port is simply by looking at the back of the switch 902. But, it may be difficult for the user/network administrator to know the location of the standard plug. This problem is solved by using the new smart plug 908a, 908b . . . 908c.

Figure 20:
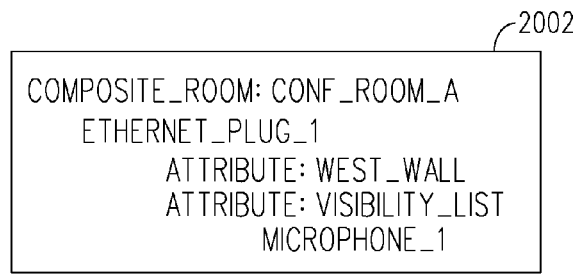

The smart plug 908a, 908b . . . 908e is a wall plug but it also contains active circuitry such that it functions as an Ethernet end system. As a result, the smart plug 908a, 908b . . . 908e automatically shows up in the catalog 2002 as shown in FIG. 20. The user/network administrator can then add some additional information to the entry of that catalog 2002. For example, the user/network administrator can add a location attribute (e.g., west-wall) to the entry in the catalog 2002 which describes the geographical position of the smart plug 908b (e.g., Ethernet_Plug_1). To do this, the user/network administrator must know the location of the particular smart plug 908b and to obtain this information the user/network administrator could have the cataloging device 906 perform a continuity check. For instance, the cataloging device 906 could be instructed to send a message to the smart plug 908b that tells that smart plug 908b to turn on a light, make a noise or both (see lights in the smart plugs 908a, 908b . . . 908e shown in FIG. 9). After performing this continuity check, the user/network administrator can enter the geographic location of this particular smart plug 908b into the catalog 2002.

Referring back to FIG. 9, the exemplary point-to-point Ethernet LAN 900 is shown to have five smart plugs 908a, 908b . . . 908e. As can be seen, four of the smart plugs 908b, 908c, 908d and 908e have some sort of end system (microphone 910a and 910b or speaker 912a and 912b) plugged into them and one of the smart plugs 908a does not have an end system plugged into it. When there is nothing plugged into the smart plug 908a, then that smart plug 908a acts as an Ethernet end system and the user/network administrator can perform a continuity check to determine the location of that particular smart plug 908. The switch 902 (and cataloging device 906) can also determine which port 904b is connected to this particular smart plug 908a. However, when there is an end system plugged into the smart plug 908b, 908c, 908d and 908e, then that smart plug functions just like a standard plug. It is no longer an Ethernet end system. Of course, the user/network administrator if desired can perform continuity checks to determine the locations of these smart plugs 908b, 908c, 908d and 908e before they plug the end systems into them.

Figure 21:
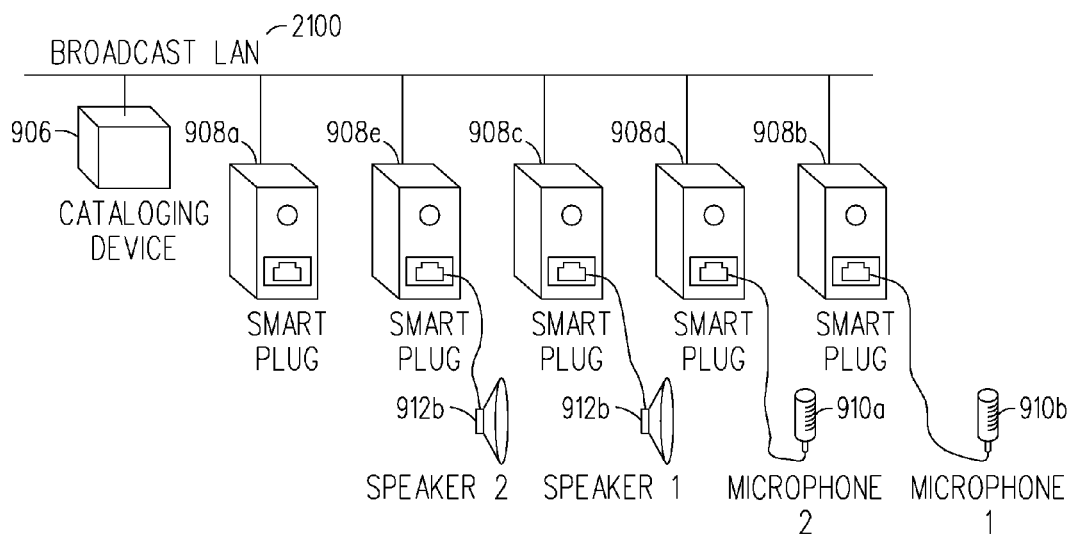

Referring to FIG. 21, there is a diagram illustrating an exemplary broadcast Ethernet LAN 2100 which is similar to the point-to-point Ethernet LAN 900 discussed above except that there is no switch 902 and that the smart plugs 908a, 908b . . . 908e are going to always function as Ethernet end systems whether or not there is an end system (microphone 910a and 910b or speaker 912a and 912b) plugged into them. In this case, the cataloging device 906 can at any time tell what device (microphone 910a and 910b or speaker 912a and 912b) is plugged into what smart plug 908a, 908b . . . 908e by querying the smart plug 908a, 908b . . . 908e itself. For instance, the cataloging device 906 can determine this information by having a smart plug 908b snoop/read the packets (or media stream) that pass through it. Then, that smart plug 908b can look at the source address of the packets (or media stream) to identify the plugged-in end system (microphone 910a). The smart plug 908b would send this information to the cataloging device 906. The cataloging device 906 now has enough information to determine the physical location of the end device (microphone 910a).

From the foregoing, it should be appreciated that the present invention can be used in a wide variety of applications in addition to the conference room example that was described above with respect to FIGS. 1-21. For instance, the present invention can be used in home applications where an Ethernet LAN would be used to connect a wide range of end systems including talking devices such as a television, a VCR player, a DVD player, a stereo/receiver, a CD player, a DVR (e.g., TIVO™ device), an Ipod™/mp3 device, a musical instrument etc. . . . and listening devices such as speakers, a television, a video projector etc. . . . (note how a television can be considered both a talking device and a listening device). FIG. 22 illustrates an exemplary Ethernet LAN 2200 which includes a switch 2202 (with a cataloging device 2204 incorporated therein) and multiple smart plugs 2206a, 2206b . . . 2206g that are respectively connected a DVD player 2208, a television 2210 and 5 speakers 2212a, 2212b . . . 2212e. Alternatively, this Ethernet LAN 2200 can be used to connect an iPOD™/television/speakers, a computer/television/speakers, a camera/television/speakers, a computer/television/speakers, a TIVO™/multiple televisions/speakers, an Xbox™/television/speakers etc. . . .

Although multiple embodiments of the present invention have been illustrated in the accompanying drawings and described in the foregoing detailed description, it should be understood that the invention is not limited to the embodiments disclosed, but is capable of numerous rearrangements, modifications and substitutions without departing from the spirit of the invention as set forth and defined by the following claims.

What is claimed is:

1. A local area network, comprising:
   a talking device;
   a plurality of listening devices;
   a cataloging device that builds one or more catalogs by obtaining basic information about said talking device and said listening devices, including positional information;
   a user interface for allowing a user of the talking device to interface with the relevant catalog, update the catalog with additional user attribute information using the user interface and select at least one of the listening devices;
   said cataloging device provides a relevant catalog selected from the one or more catalogs to said talking device;
   said talking device includes an interface which enables a user to select at least one of the listening devices identified in said relevant catalog;
   said talking device sends a subscribe-request message to said selected at least one listening device requesting that said selected at least one listening device subscribe to said talking device enabling said talking device to send a media stream to the selected at least one listening device;
   said selected listening device sends a subscribe message to said talking device in response to receipt of the subscribe-request message from said talking device; and
   said talking device sends the media stream to the selected at least one listening device.

2. The local area network of claim 1, wherein said talking device is plugged into a smart plug which enables said cataloging device to determine which of the one or more catalogs is the relevant catalog that should be provided to said talking device.

3. The local area network of claim 1, wherein said subscribe-request message is an AVB subscribe-request message.

4. The local area network of claim 1, wherein said cataloging device performs a plurality of continuity checks to obtain the positional information associated with the listening devices.

5. The local area network of claim 1, wherein said relevant catalog is an AVB relevant catalog.

6. The local area network of claim 1, wherein said talking device is:
   a microphone;
   a DVD player;
   a stereo/receiver unit;
   a television;
   a CD player;
   a DVR;
   a mp3 device; or
   a musical instrument.

7. The local area network of claim 1, wherein said listening device is:
   a speaker; or
   a television/video projector.

8. The local area network of claim 1, wherein said subscribe-request message is an UPnP subscribe-to-me command.

9. The local area network of claim 1, wherein said relevant catalog is an UPnP relevant catalog.

10. A method for configuring a local area network, said method comprising the steps of:
    providing a cataloging device that builds one or more catalogs by obtaining information about a talking device and a plurality of listening devices, including positional information;
    providing a user of the talking device with a relevant catalog selected from the one or more catalogs which contains information associated with the listening devices;
    providing a user interface to allow the user of the talking device to interface with the relevant catalog, update the catalog with additional user attribute information and select at least one of the listening devices;
    enabling the talking device to send a media stream to the selected at least one listening device by sending a subscribe-request message to said selected at least one listening device requesting that said selected at least one listening device subscribe to said talking device;
    receiving a subscribe message from the selected at least one listening device in response to the sending of the subscribe-request message; and
    sending the media stream from the talking device to the selected at least one listening device.

11. The method of claim 10, further comprising the step of plugging the talking device into a smart plug which enables the cataloging device to determine which one of a plurality of catalogs is the relevant catalog that should be provided to the user of said talking device.

12. The method of claim 10, further comprising a step of performing one or more continuity checks so the cataloging device is able to learn a geographical position of the at least one listening device.

13. The method of claim 10, wherein said talking device is:
    a microphone;
    a DVD player;
    a stereo/receiver unit;
    a television;
    a CD player;
    a DVR;
    a mp3 device; or
    a musical instrument.

14. The method of claim 10, wherein said at least one listening device is:
    a speaker; or
    a television/video projector.

* * * * *